United States Patent
Nguyen (10) Patent No.: US 9,158,526 B1
(45) Date of Patent: Oct. 13, 2015

(54) APPLICATION UPDATE USING MULTIPLE NETWORK CONNECTIONS

(75) Inventor: Kevin V. Nguyen, Allen, TX (US)

(73) Assignee: Open Invention Network, LLC, Durham, NC (US)

( * ) Notice: Subject to any disclaimer, the term of this patent is extended or adjusted under 35 U.S.C. 154(b) by 871 days.

(21) Appl. No.: 13/293,407

(22) Filed: Nov. 10, 2011

Related U.S. Application Data (60) Provisional application No. 61/412,270, filed on Nov. 10, 2010.

(51) Int. Cl.
*G06F 15/16* (2006.01)
*G06F 9/445* (2006.01)
*H04L 12/24* (2006.01)
*H04W 76/00* (2009.01)

(52) U.S. Cl.
CPC *G06F 8/65* (2013.01); *H04L 41/08* (2013.01); *H04W 76/00* (2013.01)

(58) Field of Classification Search
CPC .......... G06F 8/65; H04L 41/08; H04W 76/00
See application file for complete search history.

(56) References Cited

U.S. PATENT DOCUMENTS

| | | | |
|---|---|---|---|
| 2004/0133887 A1* | 7/2004 | Herle et al. | 717/171 |
| 2007/0042766 A1* | 2/2007 | Herle | 455/419 |
| 2007/0091168 A1* | 4/2007 | Lee | 348/14.01 |
| 2007/0243900 A1* | 10/2007 | Edwards et al. | 455/554.1 |
| 2008/0016199 A1* | 1/2008 | Mooney | 709/223 |
| 2008/0188216 A1* | 8/2008 | Kuo et al. | 455/424 |
| 2010/0131652 A1* | 5/2010 | Brewis et al. | 709/227 |
| 2012/0135719 A1* | 5/2012 | Haughn | 455/414.1 |
| 2014/0105111 A1* | 4/2014 | Karaoguz et al. | 370/328 |

\* cited by examiner

*Primary Examiner* — June Sison
(74) *Attorney, Agent, or Firm* — Haynes and Boone, LLP (57) ABSTRACT

A system and method that enables an application to retrieve application update from the software vendor using one or more network connection. The application checks for updates when it is invoked by the user. The checking of updates is done by sending a request to the vendor server via one or multiple network connections. The network connection can be wired or wireless. By using multiple network connections, the update process can send and receive update data faster than using one network connections. Another aspect of the invention is if the checking for update request failed via the default or $1^{st}$ network connection, the application will check for the next available network connection to send the update request. By checking for update from the vendor, the application will always have the most up to date patches, fixes, and/or new features.

17 Claims, 13 Drawing Sheets

APPLICATION UPDATE USING MULTIPLE NETWORK CONNECTIONS

CROSS-REFERENCE TO RELATED APPLICATIONS

This invention claims priority to application provisional application No. 61/412,270 entitled "Application Update Using Multiple Network Connections" filed Nov. 10, 2010 all of the contents which are hereby incorporated by reference, and which is a continuation-in-part of a previous invention entitled "Simultaneous Operation Of A Networked Device Using Multiple Disparate Networks."

FIELD OF INVENTION

This invention relates to a system and method for updating application remotely using one or multiple network connections in a networked capable device.

BACKGROUND OF THE INVENTION

Application updating over a network is an effective way to keep an installed application on a network capable device up to date with a new release and/or fixes. A networked capable device can be a personal computer, a laptop, a net book, a mobile device, a music player, an electronic book enabled device and any device including a processor and memory that can receive and/or transmit data over a network. It would be beneficial for the application updating process to be able to send and receive update information to and from more than one wired or wireless network connections, in order to selectively and/or dynamically determine which network to use in case of network routing failure.

SUMMARY OF THE INVENTION

The disclosure allows an installed application Update Process to dynamically determine which network connection to use in case of network routing failure. The Update Process will interface with the Routing Program, that described in the Simultaneous Operation Of A Networked Device Using Multiple Disparate Networks invention, to connect and route the Update Process's data between the application and the vendor's server. The Routing Program will determine which network connection to use for the data routing.

In one aspect of the disclosure, the system shows the Update Process send and receive data without a routing program. A mobile device, like a smart phone, usually has voice/data connection where the data is routed via the phone carrier network and the Wi-Fi connection where the data is route via the user wireless network or any available Wi-Fi network in the area. The Update Process will use the preferred connection that is set by the phone configuration to send and receive update data. If the Update Process is unable to connect to the Vendor's server via the default connection, for example, the voice/data connection, it will connect to the server using the secondary connection, the Wi-Fi connection. If both networks are unavailable, the Update Process will terminate itself until next time when the user invokes the application.

In another aspect of the disclosure, the system shows the Update Process in a mobile device use the best available network connection to check for application update. The measurement for the best available network for a mobile device is the signal strength of the voice/data connection via the phone carrier network or the Wi-Fi connection. The Update Process retrieves the signal strengths of all available network connections in the device then chooses the best connection with the strongest signal strength to use for checking application's update.

In another aspect of the disclosure, the system shows the Update Process used the fastest network connection in a mobile device to check for application update. One way to determine which available network connection has the fastest data transfer rate is to send the request for application update to all available networks in a mobile device. The first network connection that receives response is the fastest one. The same network connection is also use to download the new update if it is available and approved by the user. All other subsequence network connections are disconnected and ignored the response if any.

In another aspect of the disclosure, the system shows the Update Process used more than one network connection in a mobile device to check for application update. The Update Process retrieve available network connection, determine the signal strength of each network connection for stable data routing, and use those network connections for send request and receive application update data. The checking for Application update can send to the $1^{st}$ network connection and the download the update data can send to the $2^{nd}$ network connection. In the case of multiple applications running in a mobile device. The same process can be use to maximize the network bandwidth for faster transferring data in a mobile device.

In another aspect of the disclosure, the system describes how to connect to the Vendor's server, check for new updates, and validate the user's application before allowing the Update Process downloads new data from the server. The connection to the server needs to be a secured connection by using a SSL (Secured Socket Layer) protocol to prevent illegal data capture for duplicating the process. The protocol uses a third party Certificate Authority to identify the server or both the client and the server of the transaction then the client encrypts the data with the server's public key and send the encrypted data to the server. The server decrypts the data; process the request, then encrypts the response and sends it back to the client. Then, the client decrypts the response for processing. When the Update Process, a client, connected to the vendor's server, it sends a request containing the running application version number, the installed date and time, the application unique identifier, the networked capable device information like device id or hardware id, and any other data that relevant to the application vendor's server. The application version number is use by the server to check for out-of-date application. Other data is used to check for the genius installed application. The server sends response back to the Update Process whether the updated is available for download. Based on the user's response, the Update Process will send another request to the vendor's server to retrieve the update data or terminate the process.

An alternate embodiment of the Update Process shut down when the device's networks are unavailable is to keep sending request to the Vendor's server in a timing interval until the connection is made and received response from the server. Another way is to check if the Vendor's server is reachable across an Internet Protocol network by Ping the host computer on a timing interval. If the Pinging is successful via a network connection of a Network Capable Device then the same network connection can be use the send update request. Ping is an Internet Control Message Protocol echo request whose data is expected to be received back in a reply if the destination is reachable. For example, if a mobile device has multiple network connection like voice/data and Wi-Fi connections then the Update Process can loop to all available network connection and send a Ping to the Vendor's server to check for connectivity.

When a user invokes an application on his/her network capable device with wired and wireless network connections, on a separated thread, an Update Process checks for new updates by connecting and sending a request to the vendor's server.

Once the Update Process connected to the Vendor's server, it sends the application's data to the server for validating and comparing with the data on the server. The application data can include the version number, the installed date and time, the application identifier, the networked capable device information like device id or hardware id, and any other data that can be used to validate and check for the newer version of application on the Vendor's server. The server sends a response back to the Application's Update Process to let it know whether an update is available to download. If an update is available, the Update Process asks the user for permission to download by notifying the user, either through a pop-up dialog window or on the application window. The notification can be right after the Update Process, received the response from the server, or until the user exits from the application. If there is not any update, the Update Process will terminate by itself.

If the user allows new update, the Update Process sends another request to the server to retrieve the new data. If the request to retrieve the new update failed to connect to the Vendor's server on the $1^{st}$ network connection, the Update Process will send the request to the second network connection. If the user chooses not to update his/her application, then the Update Process terminates by itself until next time when the user invokes the application.

An example embodiment of the present invention may include a method of updating an application. The method may include invoking the application on a local computing device, identifying a connection strength of a plurality of available network connections available to the local computing device and sending a request to a vendor server to check for an application update, the request being sent from at least one of the plurality of network connections available to the local computing device. The method may include receiving a notification that an application update is available and downloading and receiving the application update.

Another example embodiment of the present invention may include an apparatus configured to update an application. The apparatus may include a processor configured to invoke the application on a local computing device, and identify a connection strength of a plurality of available network connections available to the local computing device. The apparatus may also include a transmitter configured to send a request to a vendor server to check for an application update, the request being sent from at least one of the plurality of network connections available to the local computing device and a receiver configured to receive a notification that an application update is available and download and receive the application update.

DETAILED DESCRIPTION OF THE INVENTION

Figure 1:
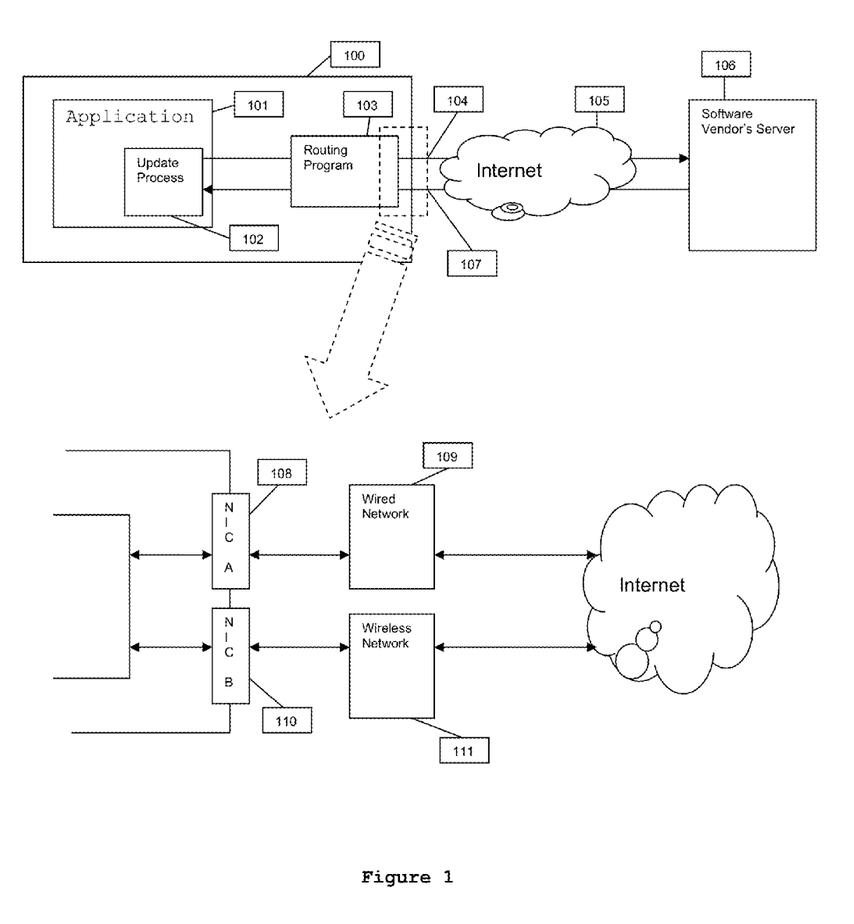
FIG. 1 is a block diagram showing the Update Process interface with the Routing Program to send request and receive response to and from the application vendor's server.

A system in accordance with an embodiment of the disclosure is depicted in FIG. 1. In the system shown in FIG. 1, a networked capable device 100 is connected to the network that has Application 101 installed. When a user invokes Application 101, on a separated thread, an Update Process 102 starts up, retrieve the application data, build the data into a request transaction 104 and send to the Vendor's server 106 via the Routing Program 103 that is running on the networked capable device 100. Another option is that the Update Process can be a menu option on the window application for the user to check new update manually. The process will be the same as above where the Update Process will start up when the user clicks on the menu option. For data security between the client application and the Vendor's server, the Vendor's server is a secured web server that only allows secured connection from the client application, the Update Process 102. For example, the client application creates an http request 104 that will connect to the Vendor's web server using SSL (Secured Socket Layer) protocol, https. The Update Process 102 does not know the existent of the Routing Program 103; it issues a connection and sending the request 104 to the vendor's server. The Routing Program 103 intercepts the request 104 that routes to any active network interface controllers 108 and 110 that are attached or embedded in the device. It determines the routing and sends the request 104 to either wired network 109 or wireless network 111. The Routing Program 103 is installed in the networked capable device as a $3^{rd}$ party software or be part of an operation system. In Windows Operating System, the Routing Program 103 can run as a Windows Service and it would start automatically when the networked capable device 100 starts up. The Vendor's Server 106, receives the request 104, determines if new updates are available to send to the client application 102, then send an http response 107 back to the client 102.

Figure 2:
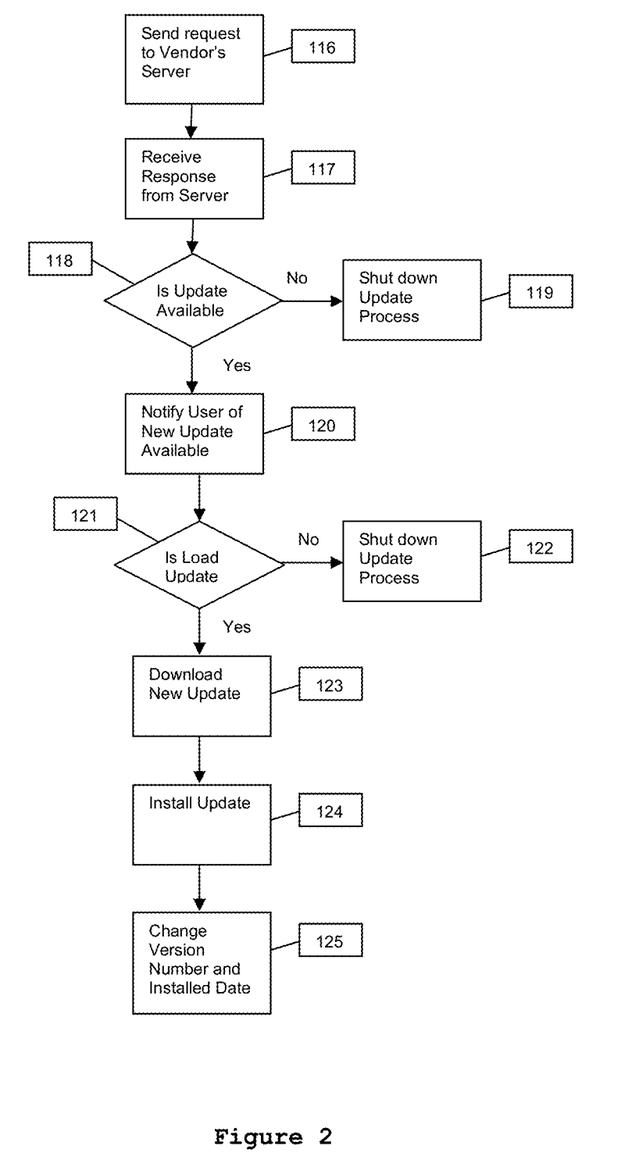
FIG. 2 is a flow diagram showing the Update Process that notifies the user of the new application update that is available for download.

FIG. 2 is a flow chart which describes each step of the Update Process. First, the Update Process sends an https request to the Vendor's secured web server, in step 116. By nature of the SSL, the request is encrypted using the server's key when the Update Process connected to the server. The application data that contains in the request can include the application's version number, the application's installed date and time, the application's unique identifier, and combination of the network capable device information like device id, network id or Mac address, processor id to identify the machine that the application installed. The Vendor's server will use the request data to validate the installed application and check for new update. Whether new updates are available or not, the Vendor's server will send an http response to the client's application, step 117. The Update Process looks at the response to see if new update is available for download, step 118. If new update is not available because the installed application is already up to date, expired application if it is a subscription purchase, or not a genius application in term of illegal copied, the Update Process terminates itself, step 119. If the new updates are available, the Update Process either notifies the user of the new update is available for download or it can wait until the user initiate the shutdown of the application, then notifies the user of new update, step 120. The notification can be a pop up dialog to ask the user for permission to download the new update or on the application's window where the user can download the new update via the menu option, step 121. If the user doesn't want the download new update, the Update Process terminate itself, step 122. If the user wants to download new update, the Update Process sends another secured request to the Vendor's server to request for the download of the new update, step 123. The Vendor's server can send the new updates to the client application via an http response or the server can send the location of the new update data for the client application. The location can be a domain name or an IP Address to where the new update stored. Once the client receives the new updates, or downloads from the server, it installs the new update to the application, step 124. If the installation is successful, the Update Process will update the version number and the installed date in the application then shuts down, step 125.

Figure 3:
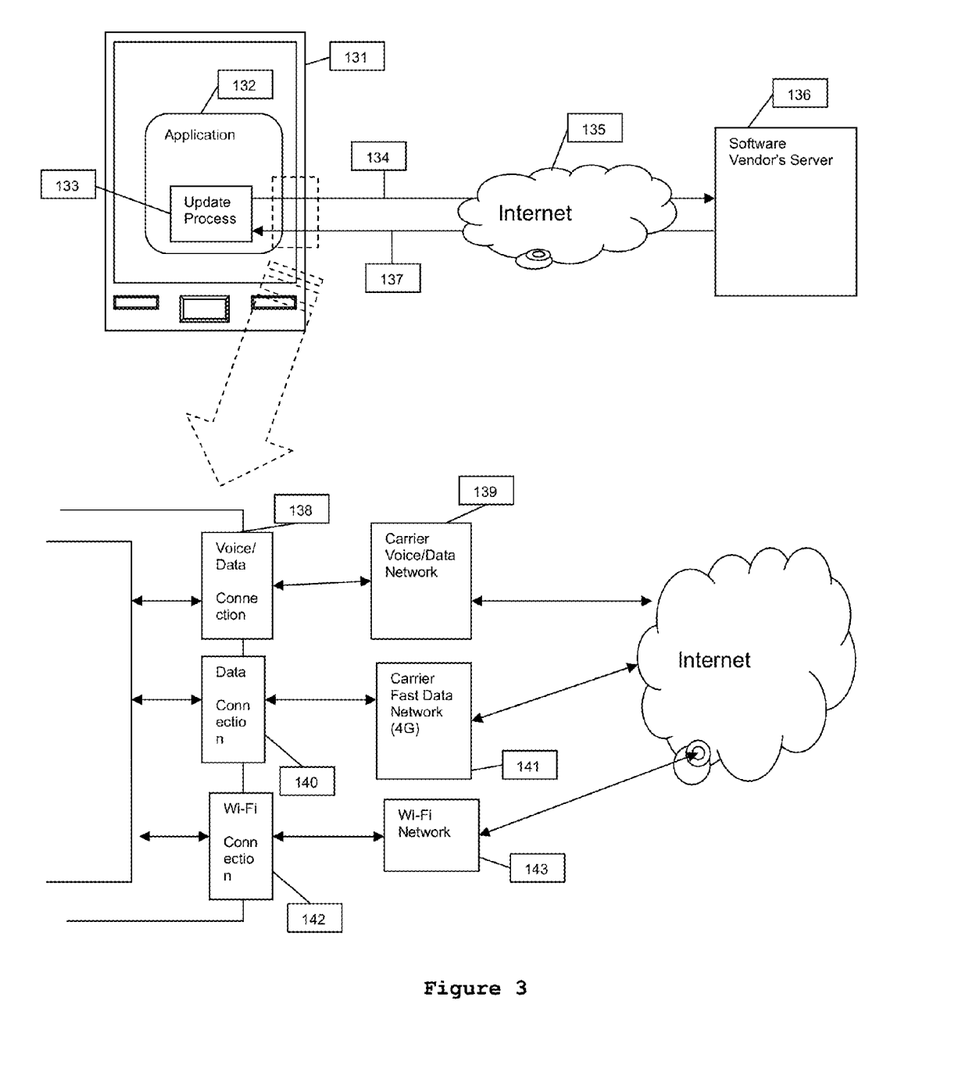
FIG. 3 is a block diagram showing the mobile device Update Process uses either the default network connection to interface with the Application Vendor's server, the secondary network connection, or the third network connection.

As is shown in FIG. 3, the illustrated embodiment of the invention consists of a mobile device which is connected over the network to a Vendor's server for software update. Typically, a mobile device like a smart phone 131 consists of two or more network connections, a voice/data connection 138, a faster data connection 140 like 4 G, and a Wi-Fi connection 142. A voice/data connection 138 is a carrier's mobile network 139. A faster data connection 140 is a carrier's mobile data network like WiMax for Sprint or LTE for Verizon. A Wi-Fi connection 140 is the user's wireless or any Wi-Fi hotspot network 141. Instead of use the Routing Program 103 to route the request 134 to the Vendor's server 136, the Update Process 133 can use similar logic in the Routing Program 103 to route the data. When a user invokes Application 132 on a smart phone 131, on a separated thread, an Update Process 133 starts up to automatically check for new software update. The Update Process 133 retrieves the running application data, builds a request 134, and sends it to the Vendor's Server 136 via the default network connection. Usually, the default network connection on a smart phone is the voice/data connection 138. If for some reason, the Update Process 133 cannot connect the Vendor' Server 136 using the voice/data connection 138, then it will send the same request to the Vendor's server 133 using the faster data connection 140. If the Update Process 133 is unable to connect the Vendor's server 136 on either network connection, the process will try to connect to the server using the Wi-Fi connection 142. If the Wi-Fi connection 142 also failed, the process will terminate itself. For example, the Update Process 133 builds an https request with the application data, then sends it to the Vendor's secured web server 136. The steps of sending an https request 134 consists of establishing a connection with the server 136; if the connection is successful, the request 134 is encrypted with the encryption key that is sent by the server 136; then the client 133 sends the request 134 to the server 136. If client 133 is unable to connect to the server 136 because the voice/data connection 138 has degraded by a weak carrier's mobile signal, the Update Process 133 checks the faster data connection network 4 G signal and sends the https request 134. Again, if the faster mobile data connection 4 G 140 is not available, the Update Process 133 checks the Wi-Fi signal and access the Wi-Fi connection 142 to send the https request 134. When the server 136 receives the request 134, it decrypts the request 134 and checks the version number for new update. The server 136 sends the https response to the client 133 through the internet 135 using the same connection that the client 133 initiated. After the client 133 receives the response, the connection is terminated.

Figure 4:
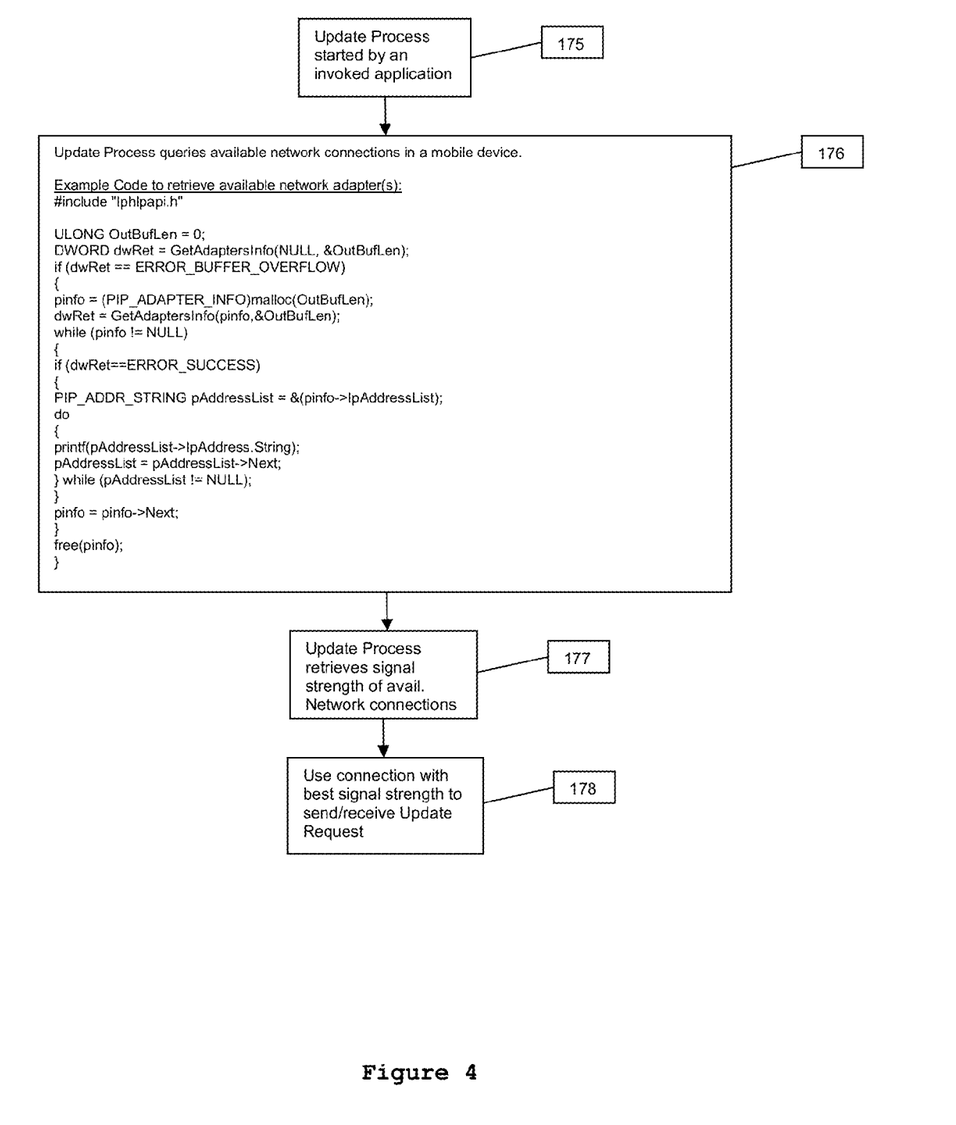
FIG. 4 is a flow chart showing the Update Process determines the best signal strength network connection to send and receive application's update from the Application Vendor's server within a mobile device.

As is shown in the flowchart in FIG. 4, a user invokes an application in a mobile device, on a separated thread, an Update Process start up to automatically check for new software update, in step 175. The Update Process retrieves all available network connections in a mobile device, in step 176. Then, it would retrieve signal strengths of all available networks in a mobile device, in step 177. For example, in a Window mobile device, available network adapters can be determine by using GetAdaptersInfo function in IPHelper APIs of Window Mobile SDK. The signal strength of each available connected network can be retrieved from the registry at the [HKEY_LOCAL_MACHINE\System\State\Phone] location. The "Signal Strength" represents the signal value from 0 to 100. The Window Mobile Operating System uses this value to show the bars on the phone to represent the current signal strength for each connected network. The Update Process can use RegistryNotifyCallback function in Windows Mobile SDK to get notified when the registry value change and to retrieve the values from different connected network. The connected network with the strongest signal strength is used to send update request to the application vendor's server, in step 178.

Figure 5:
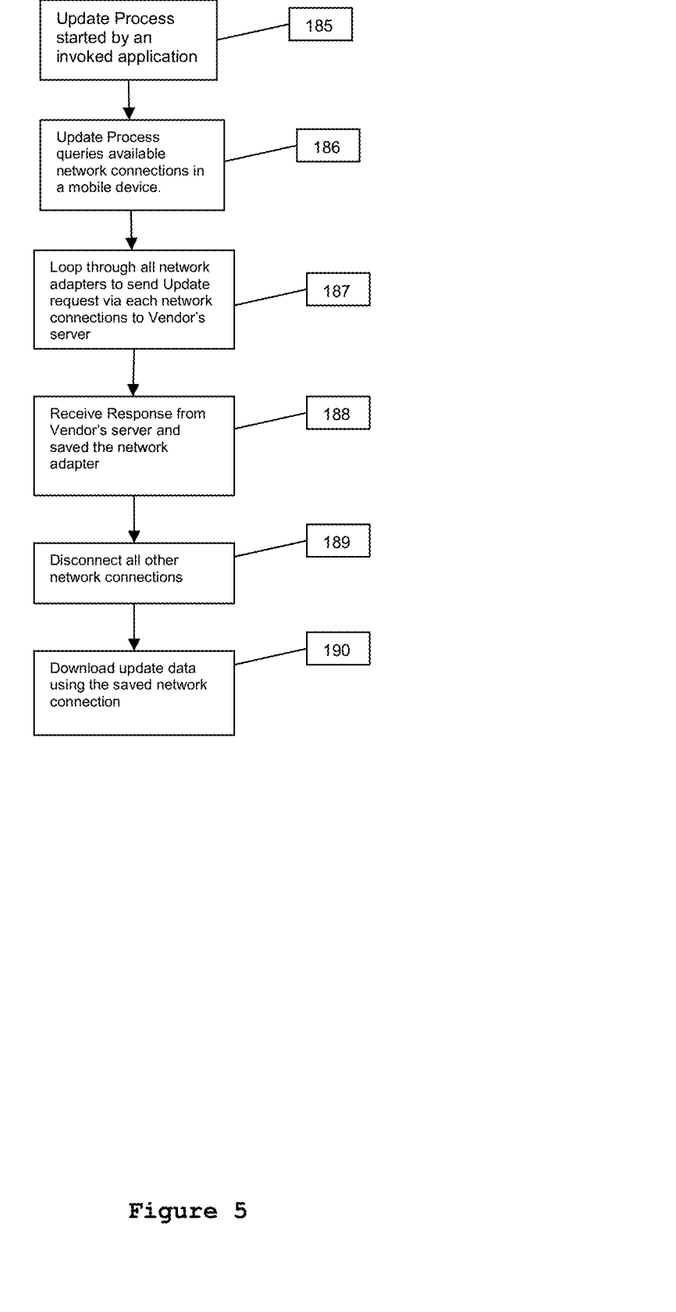
FIG. 5 is a flow chart showing the Update Process sends request via each of the available network connections to the Vendor's server. Then, the first network connection that receives response from the Vendor's server is the fastest network. The same network connection is used to download update data if any. All other network connections are disconnected from the Vendor's server and ignored the response.

As is shown in the flowchart in FIG. 5, an Update Process retrieves all available network connections in a mobile device, in step 186. Once the Update Process queries all available Network connection in the mobile device, it can send request to the vendor server using each of the available Network connection, in step 187. For example, in a Window mobile device, available network adapters can be determine by using GetAdaptersInfo function in IPHelper APIs of Window Mobile SDK. Then, WebRequest Class can be use to send http request to the Vendor server to query for Update data. The same request will be initiates and send via each network adapter to the Vendor's server and the $1^{st}$ response received by the Update Process is used to determine if Update Data is available for download, in step 188. All other responses from other network adapter are ignored and disconnect from the Vendor's server, in step 189. If the user wants to download the update data, the same network adapter that received the $1^{st}$ response is used to send request for download, step 190.

Figure 6:
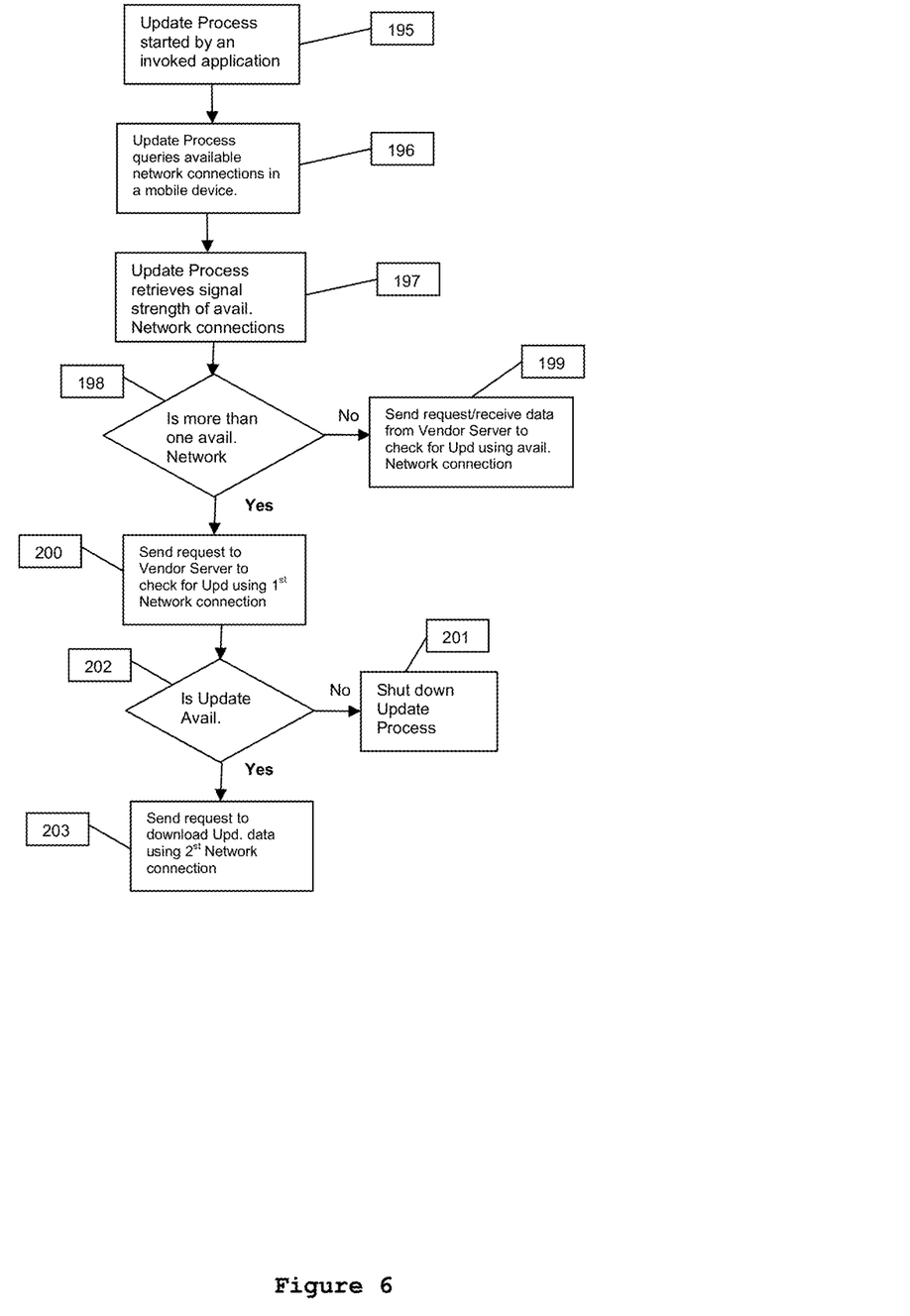
FIG. 6 is a flow diagram showing the Update Process sends and receives update data using multiple network connections.

As is shown in the block diagram in FIG. 6, the Update Process retrieves all available network connections in a mobile device, in step 196. Then, it retrieves the signal strength of each network connections to determine which network connection has strong signal strength, in step 197. If there is only one connected network connection, the Update Process uses it to check for new updated data and download if it is available, in step 199. If there are two connected network adapters that are available to route data to the Vendor server, in step 198, the Update Process will use the first network connection, usually the Voice/Data connection to send the request to check for Update data, in step 200. If there is available Update data for the invoke application, in step 202, the second request to download the updated data can be sent from the second network connection, usually the Faster Data connection or the Wi-Fi connection, to download the updated data, in step 203. When multiple applications invoke in a mobile device, the Update Process of each application can use the default voice/data connection to check for updated data. If there is new updated data and the user wants to update the running applications, the Update Process will use the second available network connection to download the data for updating the application.

Figure 7:
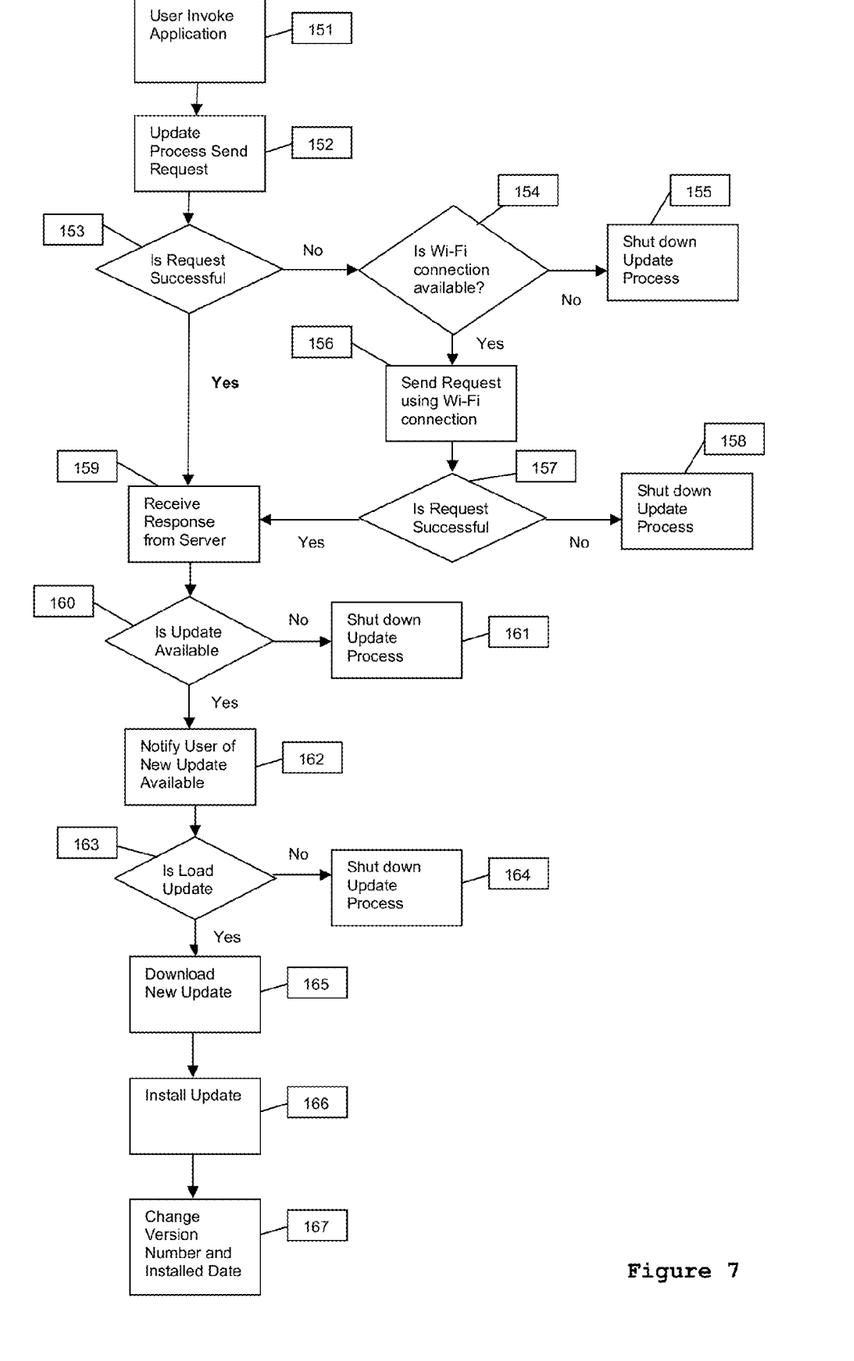
FIG. 7 is a flow diagram showing the detail logic of the Update Process in a mobile device that sends and receives the check for update data. It also shows whether to download the update data based on the user notification.

As is shown in the flowchart in FIG. 7, a user invoke an application in a mobile device, on a separated thread, an Update Process start up to automatically check for new software update, in step 151. The Update Process retrieves application data and sends an http request to the Vendor's secured web server using the primary network connection in step 152. The process of sending an http request includes a request to connect to the Vendor's web server. Step 153 checks to see the connection and sending the update request is successful. If the established of connection and/or sending update request failed because of weak or non-existent carrier's mobile signal, the Update Process check to see if there is a secondary network connection usually a Wi-Fi network, available, in step 154. If the secondary network not available, the Update Process shut down, in step 155. If the secondary network is available, the Update Process connects and sends the same request to the Vendor's server, in step 156. In step 157, the Update Process check to see if the update request is successfully sent to the Vendor's server. If the request failed to send, the Update Process shut down, in step 158. If the request is successfully sent, the Update Process wait to receive a response from the Vendor's server to see whether an update is available for download, in step 159 and 160. If new update is not available because the installed application is already up to date, expired application if it is a subscription purchase, or not a genius application in term of illegal copied, the Update Process terminates itself, in step 161. If the new update is available, the Update Process notifies the user of the new update is available for download or it can wait until the user initiate the shutdown of the application then notifies the user of new update, in step 162. The notification can be a pop up dialog to ask the user for permission to download the new update or on the application's window where the user can download the new update via the menu option, in step 163. If the user doesn't want the download new update, the Update Process terminates itself, in step 164. If the user wants to download new update, the Update Process will send another secured request to the Vendor's server to request for the download of the new update, step 165. The Vendor's server can send the new update to the client application via an http response or the server can send the location of the new update data for the client application. The location can be a domain name or an IP Address to where the new update stored. Once the client receives the new update, or downloads from the server, it installs the new update to the application, step 166. If the installation is successful, the Update Process updates the version number and installed date in the application then shut down, in step 167.

Figure 8:
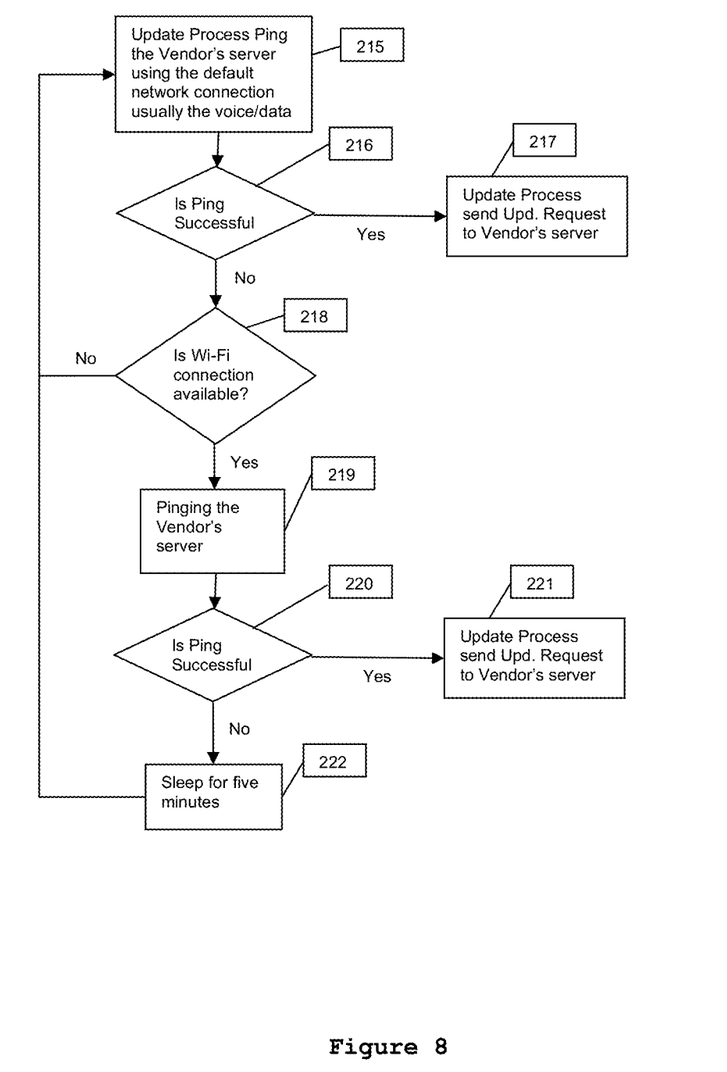
FIG. 8 is a flow diagram showing an alternate embodiment for the Update Process continues to check for update even when the network is not available instead of shut down the Update Process. The Update Process sends a Ping to the Vendor's server via each available network on a mobile device in a timely interval until a ping response is received.

FIG. 8 is a flow chart shows an alternate embodiment of the Update Process. Instead of terminates itself if all network connections on a mobile device aren't available to send update request, the Update Process will retrieve all available network connections, then start to ping the Vendor's server via the first network connection, in step 215. If the ping is successful, the Update Process will check for application update, in step 217, then shutdown the process. If the ping is not successful, the Update Process checks for the next network connection, in step 218. If the next network connection is available, usually the Wi-Fi connection, the Update Process will ping the vendor's server, in step 219. If the ping successful, then the Wi-Fi connection is used to check for application update, in step 221, then shutdown the process. If the ping is not successful, the Update Process will sleep for five minutes or any timing interval that set by the application vendor, in step 222. The purpose of the sleep step at the end of the loop is to make sure the Update Process will not to take all processing power of the mobile device.

Figure 9:
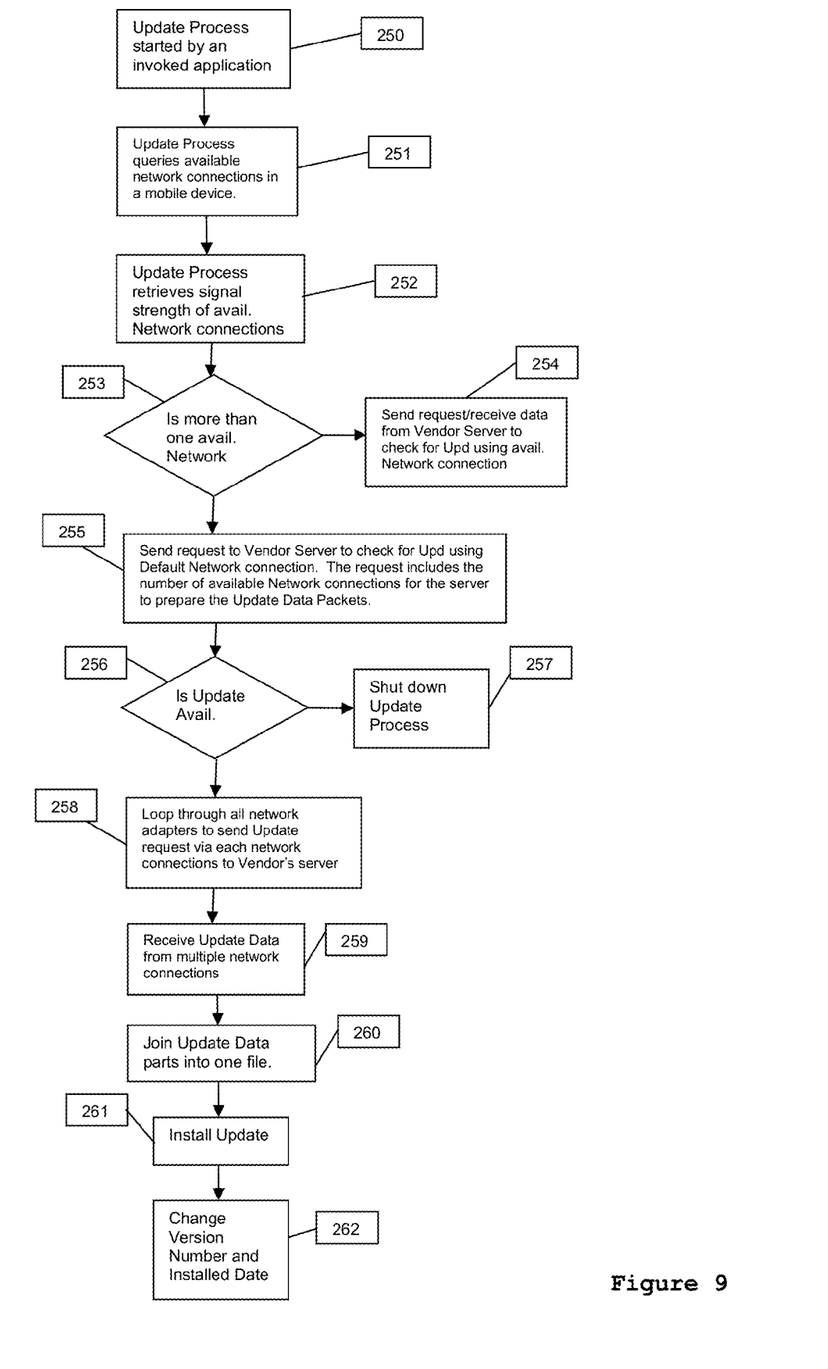
FIG. 9 is a flowchart showing an Update Process in a mobile device receives update simultaneous from multiple network connections.

FIG. 9 is a flowchart shows another alternative embodiment of the Update Process sends and receives update data to and from the Vendor's server. A user invoke an application in a mobile device, on a separated thread, an Update Process start up to automatically check for new software update, in step 250. The Update Process retrieves all available network connections in a mobile device, in step 251. Then, it retrieves the signal strength of each network connections to determine which network connection is available to send request, in step 252. If there is one connected network connection, the Update Process uses it to check for new updated data and download if it is available, in step 254. Step 253 check for two or more connected network adapters that are available to route data to the Vendor server. In step 255, the Update Process use the default network connection to send an initial request to check for Update availability and the number of connection, N, that will connect to the Vendor's server to retrieve Update Data. The Vendor's server receives the update request, if Update Data is available; the server sends response back to the Client to notify the client about the new Update Data and N number of assigned unique identifier for each of the client connection that requests for download data. Then, the server splits the update data into N (number of connection) parts to be sent to the Client. Detail of the Server functions and the Split File Process will be in FIGS. 10 and 11 respectively. If update data is available, in step 256, the Update Process loops through the available network connections to send requests to the Vendor's server for the Update Data. The requests include the unique identifier that received from the server to make sure a valid Update Data part is sent, in step 258. Once the Update Process receives all Update Data from the Vendor's server via available network connections, in step 259; it joins Update Data parts together into one file, in step 260. Detail of the Join File Process will be in FIG. 13. Once the Update Data file is successfully joined, the Update Process installs the new update to the application, step 261. If the installation is successful, the Update Process updates the version number and installed date in the application then shut down, in step 262.

Figure 10:
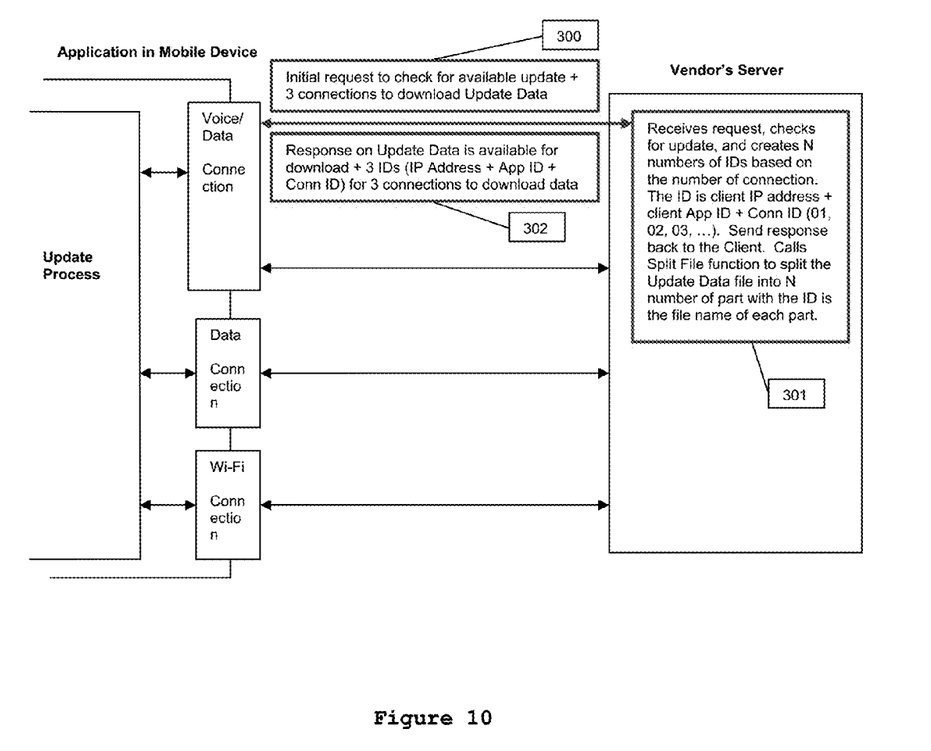
FIG. 10 is a diagram showing the Vendor's server receives initial request from the Update Process to check for Update Data. It also shows the data in the request and the response.

Diagram on FIG. 10 shows the data send back and forth between the Update Process and the Vendor's server in the initial check for update query. In step 300, the request that the Update Process sends to the Vendor's server to check for update data, contains the N number of network connection that the Update Process uses to simultaneous download the Update Data. If Update Data is available for download and the server successful validate the request from the Update Process, step 301, the Vendor's server will creates the N number of connection IDs that contains the IP Address of the request, the application id, and a counter of N number of connection (01, 02, 03, and so on). The IP Address of the client can be retrieve from the Http request header; the Application ID is from the check for update request. It is part of the data that send from the Update Process to validate the software is genius for update. Example of the connection ID is 192.168.2.1_1234_001 where 192.168.2.1 is the IP Address of the Update Process, 1234 is the Application ID, and 001 is the connection number 1 out of N number of connection to download the Update Data. After the Vendor's server issues a response to the client, the Update Process, with the Update Data availability and the connection IDs in step 302, it splits the Update Data file into N (number of connection) parts for download.

Figure 11:
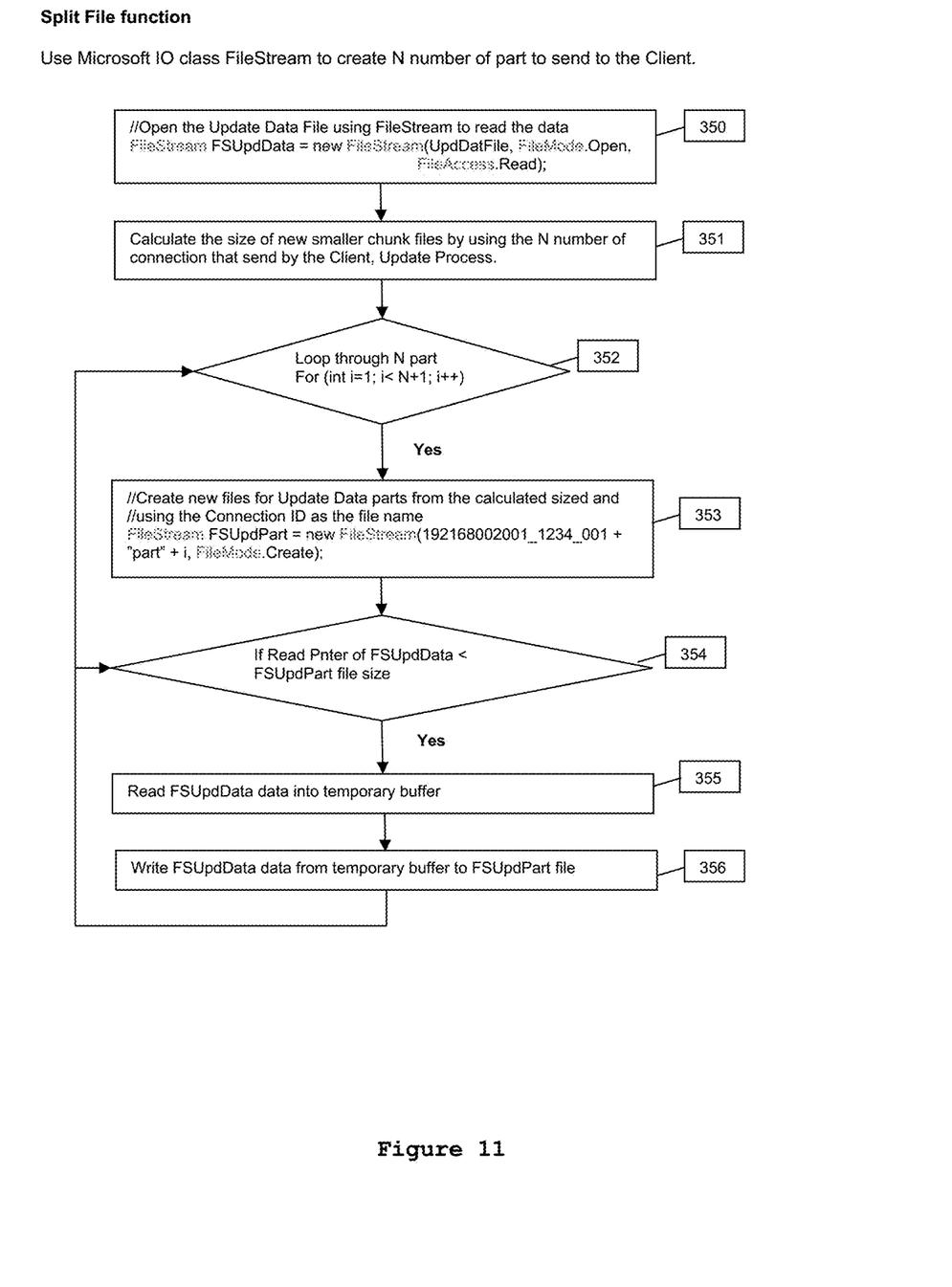
FIG. 11 is a flowchart showing the Split function that the Vendor's Server uses the split the Update Data file into smaller parts to send to the Update Process.

FIG. 11 is a Flow Chart shows the Split function that the Vendor's Server uses to split the Update Data file into smaller parts to send to the client, Update Process. The Split function can develop in any programming language that has class to manipulate a file system. For the Flow Chart in FIG. 11, Microsoft System IO FileStream class is used to read, write, open, and close files. In step 350, FileStream is used to open the Update Data file for reading the data and retrieve the file size. In step 351, the calculation of each Update Data part file size is determine by the N number of connection that receives from the Update Process. The file size of the Update Data file is divided by the N number of connection and any remainder is added to the last file of the Update Data part. For example, if the Update Data file size is 1024 MB and there are 3 connections then the result is 3 Update Data parts with 341 MB for the first 2 files and 342 MB for the $3^{rd}$ file. Loop through N number of connection, step 352, a new file is created using FileStream with the calculated size for each Update Data part. The name of the new file is the client IP Address+App ID+incremented counter. Using the example in section [0036], the file name is 192168002001_1234_001.part1, step 353. In step 354, loop through the newly created file size, read the data from the original Update Data file, step 355, and write into the part1 file, step 356, until the part1 file is full. Go to the next connection, from the loop in step 352, create the next file, part2, step 353, and read the Update Data where the read pointer left off from file part1, step 355. Then, write the data into the new file, part2, in step 356. The steps are repeated until all 3 files are written with the Update Data.

Figure 12:
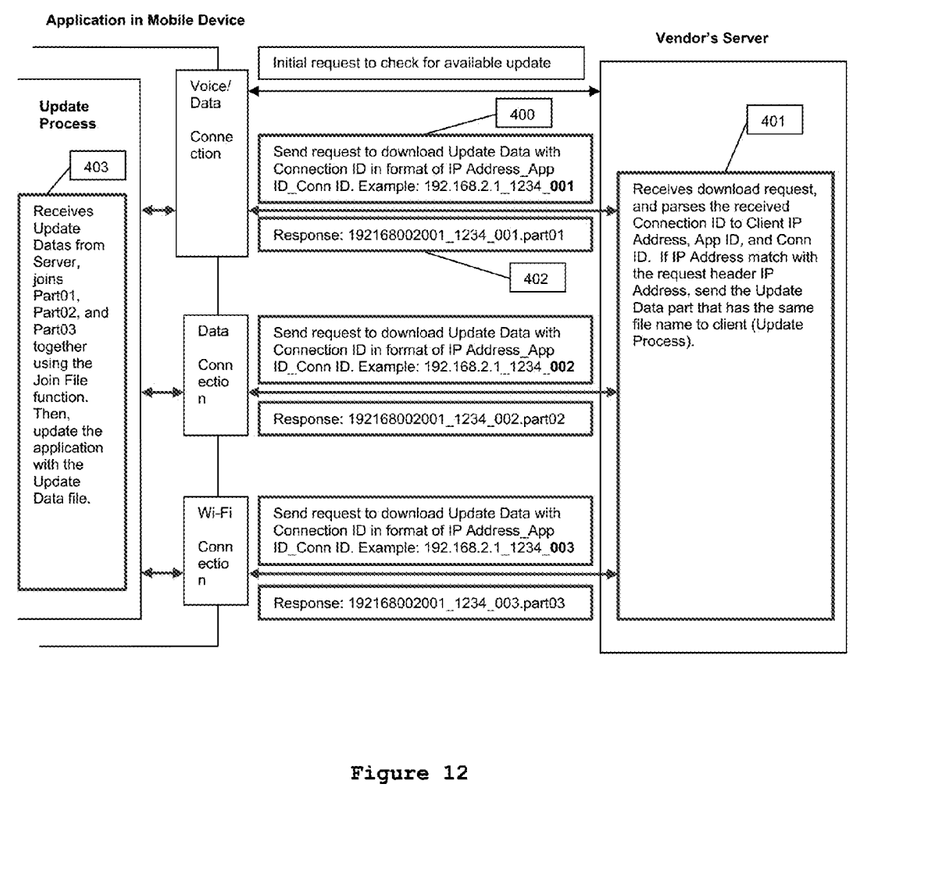
FIG. 12 is a diagram showing the Update Process sends download request to the Vendor's server and receives the Update Data parts via multiple network connection.

Diagram on FIG. 12 shows the Update Data is simultaneously download to the Update Process using multiple available network connections. Loop through all available network connection, the Update Process sends download requests containing the Connection IDs that received earlier from the check for update request. The Update Process assigned each Connection ID to each download request that sends from different network connection, step 400. Once, the server receives the request for download, it parses the Connection ID to retrieve the IP Address and compare it with the request header IP Address. If the data match, the server then converts the Connection ID to the download Update Data part file name. The server checks if the file is existed for download. For example, the Connection ID of 192.168.2.1_1234_001 is converted to file name 192168002001_1234_001.part1. If the file exists, the server sends it to the client, Update Process, and deletes the file from the server to prevent duplicate or illegal download, step 401. When the Update Process receives all download files from it connections, it issues a Join function to merge all Update Data parts into an Update Data File, step 403.

Figure 13:
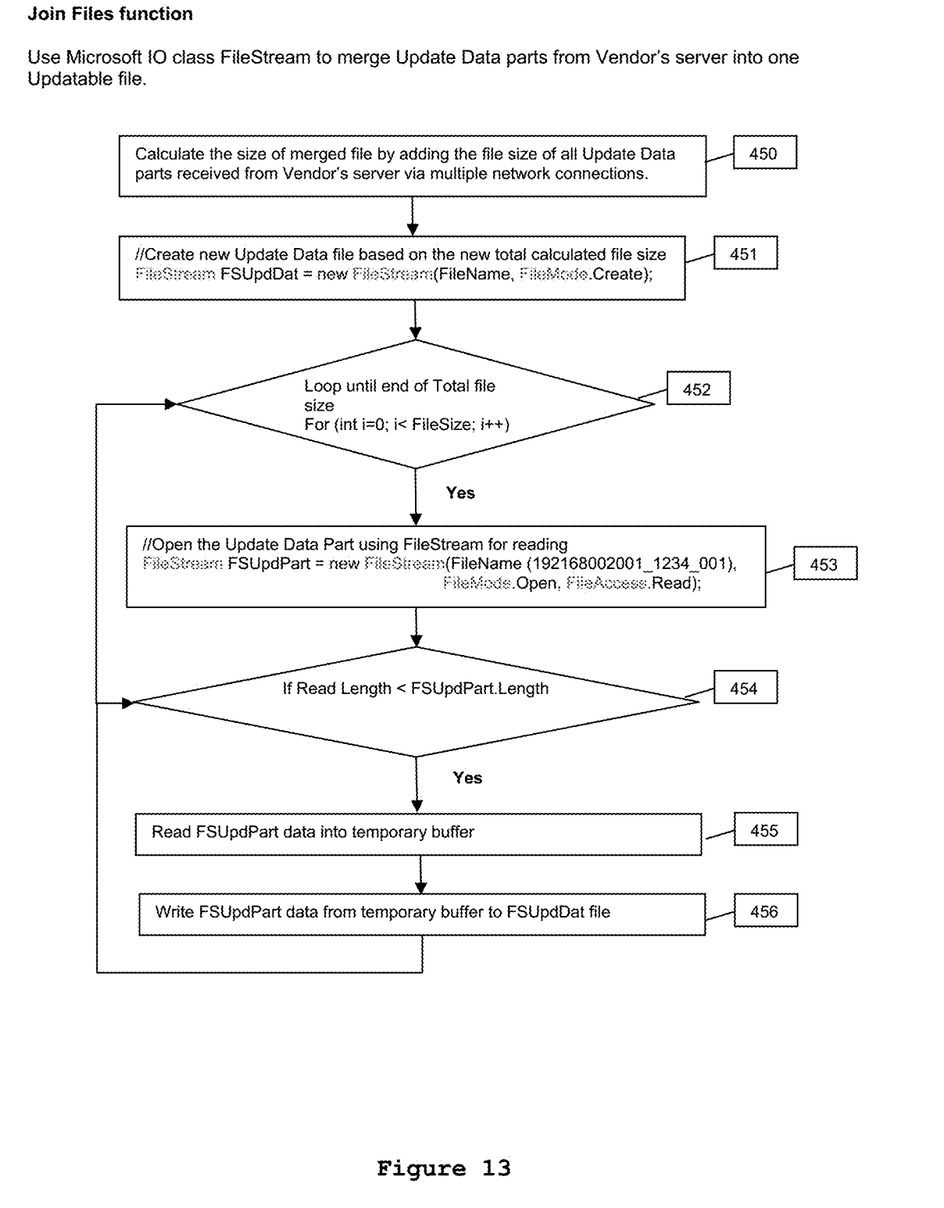
FIG. 13 is a flowchart showing the Join function that the Update Process uses to merge the Update Data parts into an updatable file to update the software.

FIG. 13 is a Flow Chart shows the Join function that the Update Process uses to merge the separated Update Data parts into one updatable file. In step 450, the calculation of the merged Update file is adding the file size of all Update Data parts that received from the Vendor's server. In step 451, the new Update Data file is created using the calculated total file size. In step 452, loop through all available Update Data parts, the Join function opens the $1^{st}$ Update Data part for reading, step 453. In step 454, until the end of file for Update Data part, the data is read into a temporary buffer, step 455. Then, the function writes the data in the temporary buffer into the new merged Update file, step 456. The steps are repeated until all Update Data parts are read and write into the merged file.

I claim:

1. A method comprising:
   invoking an application on a local computing device;
   transmitting a request to a vendor server to check for an application update, the request being sent from a first of the plurality of network connections available to the local computing device;
   receiving a notification that an application update is available;
   selecting one of the plurality of available network connections which has the greatest signal strength available to the local computing device;
   transmitting a request for the application update utilizing a second available network connection different from the first available network connection and which has the greatest signal strength available to the local computing device; and
   downloading and receiving the application update.

2. The method of claim 1, further comprising:
   transmitting application data from the local computing device to the vendor server, the application data comprising an application version number, an application install date and time, an application identifier, and local computing device identification information.

3. The method of claim 2, further comprising:
   receiving a response from the vendor server indicating that an application update is available, the response including a request for permission to begin downloading the application update; and
   transmitting another request to the vendor server to initiate the application update download.

4. The method of claim 1, wherein the application update comprises at least one of application drivers, application patches and new application features not previously installed with the application.

5. The method of claim 1, further comprising:
   querying each of the plurality of available network connections and looping through each of a respective plurality of network access adapters to determine which of the plurality of available network connections to use for updating the application.

6. The method of claim 1, further comprising:
disconnecting all of the other available network connections once the one of the plurality of available network connection has been selected.

7. An apparatus comprising:
memory which stores instructions; and
a processor which executes those instructions to perform:
invoking an application on a local computing device;
transmitting a request to a vendor server to check for an application update, the request being sent from a first of the plurality of network connections available to the local computing device;
receiving a notification that an application update is available and download and receive the application update;
selecting one of the plurality of available network connections which has the greatest signal strength available to the local computing device; and
transmitting a request for the application update utilizing a second available network connection different from the first available network connection and which has the greatest signal strength available to the local computing device.

8. The apparatus of claim 7, wherein the processor further performs transmitting the application data from the local computing device to the vendor server, the application data comprising an application version number, an application install date and time, an application identifier, and local computing device identification information.

9. The apparatus of claim 8, wherein the processor further performs receiving a response from the vendor server indicating that an application update is available, the response including a request for permission to begin downloading the application update, and transmitting another request to the vendor server to initiate the application update download.

10. The apparatus of claim 7, wherein the application update comprises at least one of application drivers, application patches and new application features not previously installed with the application.

11. The apparatus of claim 7, wherein the processor further performs querying each of the plurality of available network connections and looping through each of a respective plurality of network access adapters to determine which of the plurality of available network connections to use for updating the application.

12. The apparatus of claim 7, wherein the processor further performs disconnecting all of the other available network connections once the one of the plurality of available network connection has been selected.

13. A non-transitory computer readable storage medium storing instructions that when executed causes a processor to perform:
invoking an application on a local computing device;
transmitting a request to a vendor server to check for an application update, the request being sent from a first of the plurality of network connections available to the local computing device;
receiving a notification that an application update is available;
selecting one of the plurality of available network connections which has the greatest signal strength available to the local computing device;
transmitting a request for the application update utilizing a second available network connection different from the first available network connection and which has the greatest signal strength available to the local computing device; and
downloading and receiving the application update.

14. The non-transitory computer readable storage medium of claim 13, wherein the processor further performs:
transmitting application data from the local computing device to the vendor server, the application data comprising an application version number, an application install date and time, an application identifier, and local computing device identification information.

15. The non-transitory computer readable storage medium of claim 14, wherein the processor further performs:
receiving a response from the vendor server indicating that an application update is available, the response including a request for permission to begin downloading the application update; and
transmitting another request to the vendor server to initiate the application update download.

16. The non-transitory computer readable storage medium of claim 13, wherein the application update comprises at least one of application drivers, application patches and new application features not previously installed with the application.

17. The non-transitory computer readable storage medium of claim 16, wherein the processor further performs:
querying each of the plurality of available network connections and looping through each of a respective plurality of network access adapters to determine which of the plurality of available network connections to use for updating the application.

* * * * *